United States Patent
Sugihara

Patent Number: 5,993,349
Date of Patent: Nov. 30, 1999

[54] SYSTEM FOR LUBRICATING REVERSE SENSOR OF TOROIDAL TYPE CONTINUOUSLY VARIABLE TRANSMISSION

[75] Inventor: Jun Sugihara, Kanagawa, Japan

[73] Assignee: Nissan Motor Co., Ltd., Yokohama, Japan

[21] Appl. No.: 09/024,428

[22] Filed: Feb. 17, 1998

[30] Foreign Application Priority Data

Feb. 18, 1997 [JP] Japan ..................................... 9-033550

[51] Int. Cl.⁶ ............................. F16H 57/04; F16H 15/38
[52] U.S. Cl. .................................. 476/8; 184/6.26; 184/35
[58] Field of Search ......................... 476/8, 10; 184/6.26, 184/35

[56] References Cited

U.S. PATENT DOCUMENTS 5,052,236  10/1991  Nakano .................................. 476/10 X

FOREIGN PATENT DOCUMENTS

| | | |
|---|---|---|
| 0 373 649 | 6/1990 | European Pat. Off. . |
| 2-163562 | 6/1990 | Japan . |
| 4-78366 | 3/1992 | Japan . |
| 7-293653 | 11/1995 | Japan . |
| 7-301300 | 11/1995 | Japan . |

*Primary Examiner*—Allan D. Herrmann
*Attorney, Agent, or Firm*—Foley & Lardner

[57] ABSTRACT

A reverse sensor lubrication system in a toroidal type continuously variable transmission is disclosed. The transmission includes a forward/backward mode switching mechanism, a toroidal type power transmission unit powered by the switching mechanism, a power transmission shaft driven by an output cone disc of the power transmission unit, a transmission output shaft driven by the power transmission shaft through a gear unit interposed therebetween, a speed change control valve switching means which selectively actuates a forward movement speed change control valve and a backward movement speed change control valve, a reverse sensor which is mounted on the power transmission shaft to cause the switching means to actuate the backward movement speed change control valve when the power transmission shaft is rotated in a backward direction, and a hydraulic circuit which controls operation of the transmission. The reverse sensor lubrication system comprises a first block which, when the power transmission shaft is rotated in a forward direction, lubricates the reverse sensor by using a fluid splashed by the gear unit; and a second block which, when the power transmission shaft is rotated in the backward direction, lubricates the reverse sensor by using a pressurized fluid provided by an oil pump installed in the hydraulic circuit.

11 Claims, 11 Drawing Sheets

SYSTEM FOR LUBRICATING REVERSE SENSOR OF TOROIDAL TYPE CONTINUOUSLY VARIABLE TRANSMISSION

The contents of Japanese Patent Application 9-33550 filed Feb. 18, 1997 are hereby incorporated by reference.

BACKGROUND OF THE INVENTION

(1) Field of the Invention

The present invention relates in general to a toroidal type continuously variable transmission, and more particularly to a system for lubricating a reverse sensor of such transmission.

(2) Description of the Prior Art

As is known, a toroidal type continuously variable transmission has a toroidal power transmission unit which generally comprises input and output cone discs which are coaxially arranged and power rollers which are interposed between the input and output cone discs.

For ease of description, the toroidal type continuously variable transmission will be referred to as torocoidal-type CVT hereinafter.

As a conventional torocoidal-type CVT which exhibits a powerful transmission of torque, Japanese Patent First Provisional Publication 2-163562 shows a dual cavity type which has two viz., front and rear toroidal power transmission units coaxially mounted therein and parallelly arranged in a power train. In the transmission of this publication, output cone discs of the front and rear units are integrally connected in a back-to-back connection manner and rotate freely about a main shaft in a transmission case, and input cone discs of the units are coaxially arranged to face the respective output cone discs and rotate together with the main shaft. By inputting a torque to the input disc of the front unit, rotation of both the input discs of the front and rear units is carried out. During this, a loading cam on the main shaft applies the input disc of the front unit with a biasing force in accordance with the transmission torque, so that the two input discs of the units are biased toward the respective output discs. With this, each power roller is compressed between the associated input and output discs by a force according to the transmission torque, so that power transmission between the associated input and output discs of each power transmission unit is carried out. That is, each power roller is frictionally engaged at diametrically opposed ends with the associated input and output discs. In operation, rotation of each input disc is transmitted to the associated power rollers and the rotation of each power roller is transmitted to the associated output disc. When, under this operation, an angle of each power roller relative to the main shaft is changed, a so-called power transmission ratio between the input and output discs of each power transmission unit is continuously changed. In the transmission, there is also employed a forward/backward mode switching mechanism by which the transmission can take forward and backward modes selectively. When, due to the work of the switching mechanism, the transmission takes the backward (or reverse) mode, a reverse sensor senses the reverse rotation transmission condition of the power transmission units and operates a switching device for forward/reverse speed change control valves. With this, the speed change control of the transmission is carried out by the reverse speed change control valve.

In the above-mentioned dual cavity type torocoidal-type CVT, output rotation of the transmission is taken out from a position between the two power transmission units. The output rotation is transmitted to a countershaft which is arranged offset and in parallel with the main shaft of the transmission. The rotation of the countershaft is then transmitted through a gear unit to a transmission output shaft which is coaxially arranged behind the rear power transmission unit. The reverse sensor is mounted to a leading end of the countershaft, which is remote from the gear unit.

When, in operation, the countershaft is rotated in a forward direction to move an associated motor vehicle forward, that is, when the transmission assumes a forward mode, a one-way clutch operates to disconnect the reverse sensor from the countershaft. While, when the countershaft is rotated in a backward direction to move the vehicle backward, that is, when the transmission assumes a backward mode, the one-way clutch operates to connect the reverse sensor with the countershaft. With this connection, the reverse sensor is driven by the countershaft and actuates the forward/backward mode switching mechanism in the above-mentioned manner.

Accordingly, there is a need of lubricating the reverse sensor particularly when the reverse sensor is driven by the countershaft. Japanese Patent First Provisional Publications 7-301300 and 7-293653 show measures for such lubrication. In the measure of 7-301300 publication, a so-called "oil splashing effect" of the gear unit on the countershaft is practically used. That is, the lubrication oil splashed by the gear unit on the countershaft is led to and reserved in a recessed high portion in the transmission, and the oil is naturally led to the reverse sensor through an axially extending oil passage formed in the countershaft. In the measure of 7-293653 publication, a force feed means is employed for enforcedly feeding the reverse sensor with lubrication oil through the axially extending oil passage of the countershaft. However, due to their inherent construction, the measures of these publications have failed to exhibit a satisfied result in lubricating the reverse sensor. That is, in the former measure, it is difficult to obtain a satisfied oil splashing effect in both a case wherein the countershaft is rotated in the forward direction and a cases wherein the countershaft is rotated in the backward direction. When the oil splashing effect is not effectively made, the recessed high portion in the transmission fails to reserve a satisfied amount of oil, which tends to cause poor lubrication of the reverse sensor. In the latter measure, due to the nature of the force feed means, a larger amount of oil is enforcedly led to the reverse sensor even when the sensor needs only a smaller amount of oil like in the case wherein the countershaft is rotated in the forward direction.

SUMMARY OF THE INVENTION

It is therefore an object of the present invention to provide a measure for optimally lubricating the reverse sensor without suffering the drawbacks possessed by the above-mentioned conventional reverse sensor lubricating systems.

According to the present invention, there is provided a reverse sensor lubrication system for a toroidal type continuously variable transmission, which has two lubrication modes, one being the mode wherein under the forward mode of the transmission the reverse sensor is lubricated by a smaller amount of lubrication oil, and the other being the mode wherein under the backward mode of the transmission the reverse sensor is lubricated by a larger amount of lubrication oil.

According to the present invention, there is provided a reverse sensor lubrication system in a toroidal type continuously variable transmission. The transmission includes a forward/backward mode switching mechanism, a toroidal type power transmission unit powered by the switching mechanism, a power transmission shaft driven by an output cone disc of the power transmission unit, a transmission output shaft driven by the power transmission shaft through a gear unit interposed therebetween, a speed change control valve switching means which selectively actuates a forward movement speed change control valve and a backward movement speed change control valve, a reverse sensor which is mounted on the power transmission shaft to cause the switching means to actuate the backward movement speed change control valve when the power transmission shaft is rotated in a backward direction, and a hydraulic circuit which controls operation of the transmission. The reverse sensor lubrication system comprises a first block which, when the power transmission shaft is rotated in a forward direction, lubricates the reverse sensor by using a fluid splashed by the gear unit; and a second block which, when the power transmission shaft is rotated in the backward direction, lubricates the reverse sensor by using a pressurized fluid provided by an oil pump installed in the hydraulic circuit.

According to the present invention, there is provided a reverse sensor lubrication system in a toroidal type continuously variable transmission. The transmission includes a forward/backward mode switching mechanism, coaxially arranged front and rear toroidal type power transmission units powered by the switching mechanism, a countershaft driven by output cone discs of the two power transmission units, a transmission output shaft driven by the countershaft through a gear unit interposed therebetween, a speed change control valve switching means which selectively actuates a forward movement speed change control valve and a backward movement speed change control valve, a reverse sensor mounted on the countershaft to cause the switching means to actuate the backward movement speed change control valve when the countershaft is rotates in a backward direction, and a hydraulic circuit which controls operation of the transmission. The reverse sensor lubrication system comprises a recessed portion formed in the transmission to reserve therein a fluid splashed by the gear unit; an axially extending bore formed in the countershaft to convey the fluid from the recessed portion to an interior of the reverse sensor; a nozzle directed toward the reverse sensor; a fluid circuit connecting the nozzle to a part of the hydraulic circuit, the part containing a fluid pressurized by the oil pump; and a switch valve which opens the fluid circuit when the countershaft is rotated in the backward direction and closes the fluid circuit when the countershaft is rotated in the forward direction.

DETAILED DESCRIPTION OF THE EMBODIMENTS

Referring to FIGS. 1, 2, 4 and 5, there is shown a torocoidal-type CVT to which a reverse sensor lubrication system of a first embodiment of the present invention is practically applied.

Figure 1:
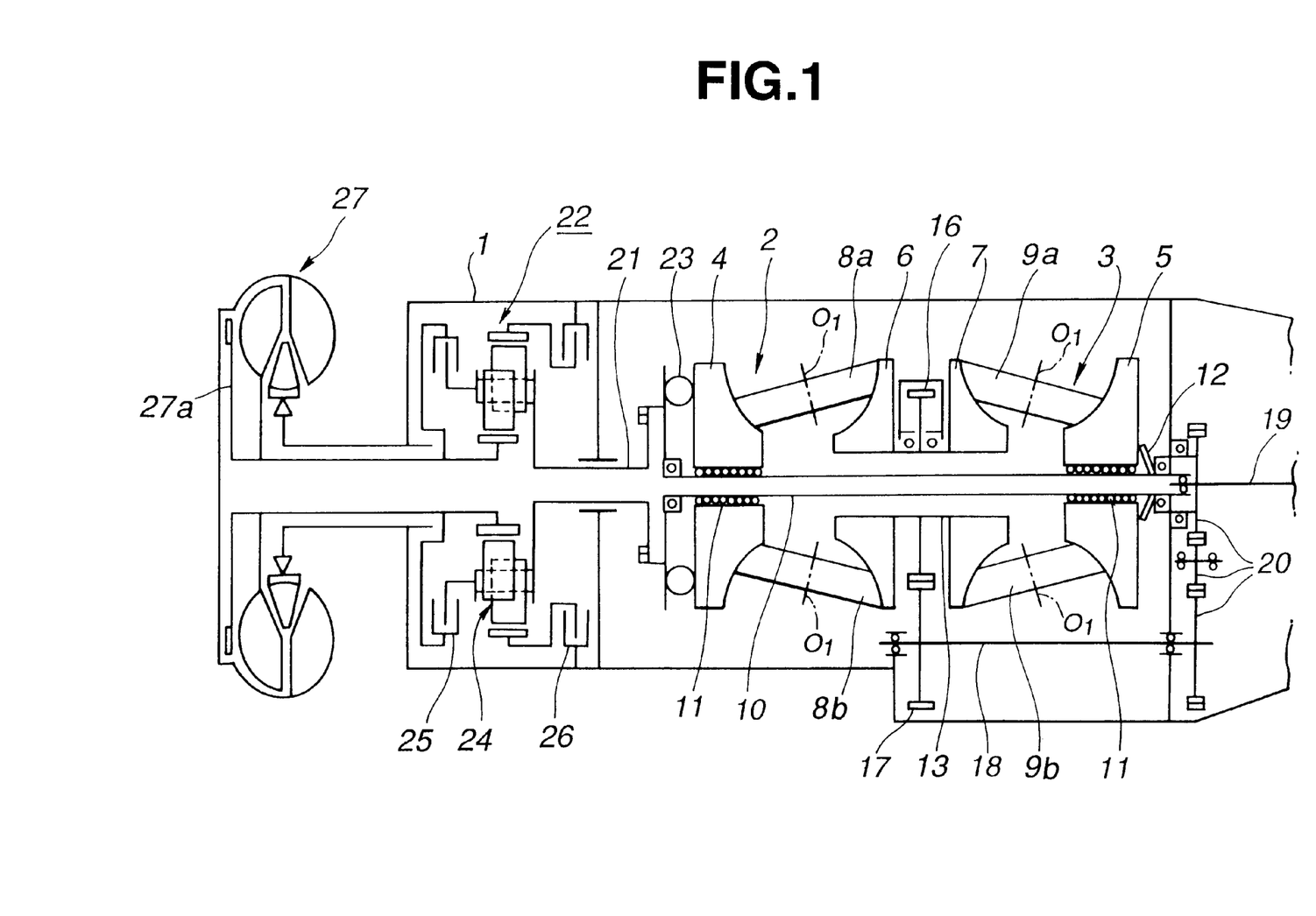
FIG. 1 is a schematic view of a torocoidal-type CVT to which a reverse sensor lubrication system of the present invention is practically applied.
Figure 2:
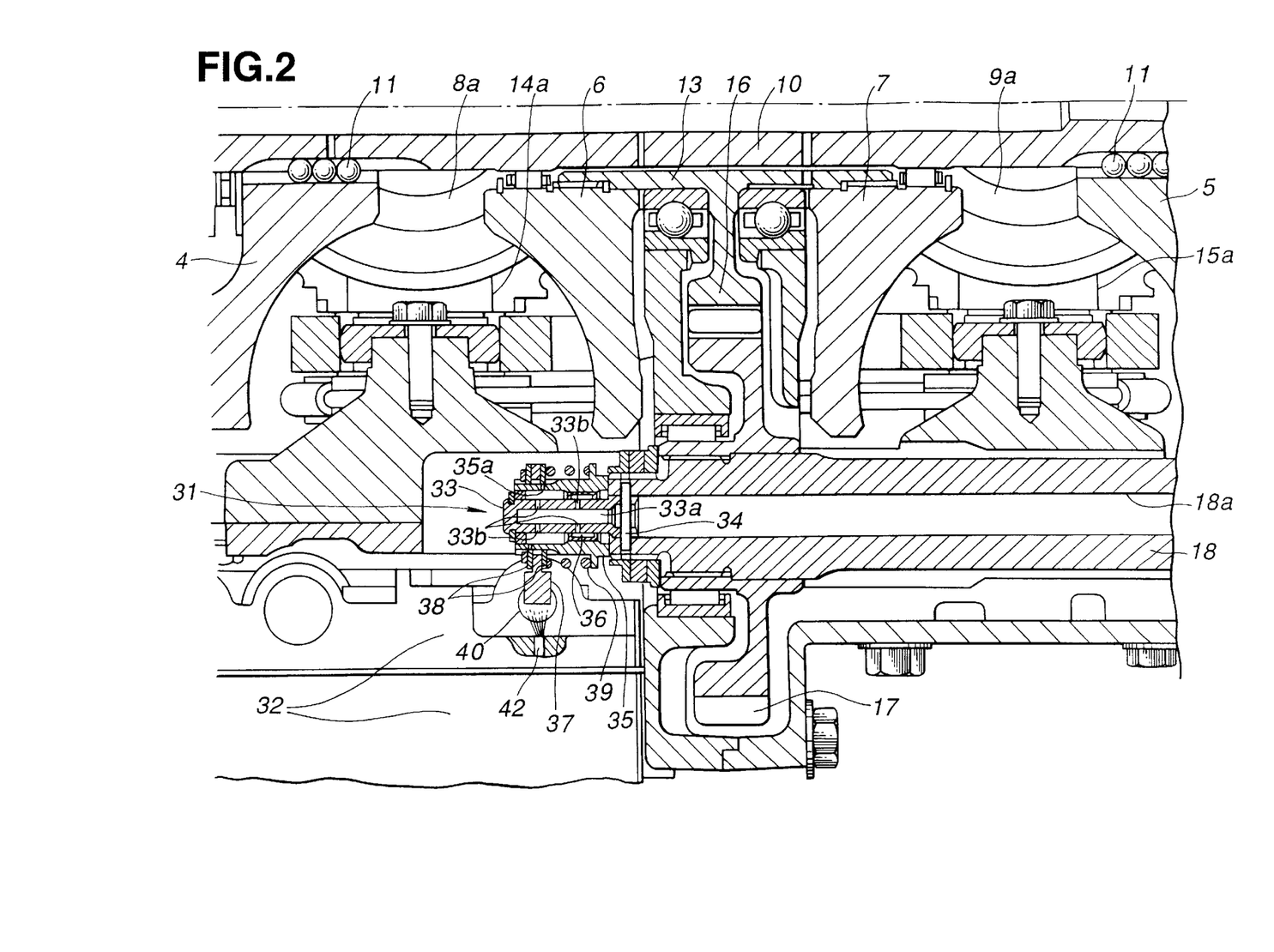
FIG. 2 is an enlarged sectional view of a portion of the transmission where a reverse sensor lubrication system of a first embodiment of the present invention is arranged.

As is understood from FIGS. 1 and 2, the torocoidal-type CVT shown comprises front and rear toroidal power transmission units 2 and 3 which are coaxially arranged in a transmission case 1. That is, the CVT shown in the drawings is of a double cavity type.

The front and rear units 2 and 3 are of the same construction and the same specification. Each unit 2 or 3 comprises an input cone disc 4 or 5, an output cone disc 6 or 7, power rollers 8a and 8b or 9a and 9b, which are arranged in a known manner. That is, the output cone discs 6 and 7 of the respective units 2 and 3 are integrally and coaxially connected in a back-to-back connection manner, and the power rollers 8a and 8b or 9a and 9b are arranged at both sides of a cone disc rotation axis, as shown.

An axially extending main shaft 10 is rotatably held in the transmission case 1. The main shaft 10 has the input and output cone discs 4, 5, 6 and 7 of the two power transmission units 2 and 3 supported thereon. The input cone discs 4 and 5 of the two units 2 and 3 are disposed on the main shaft 10 through a ball-spline unit 11, so that the input cone discs 4 and 5 can rotate together with the main shaft 10 while being permitted to slide axially on the main shaft 10. Due to the function of a disc spring 12, the input cone disc 5 of the rear unit 3 is biased toward the associated output cone disc 7.

The output cone discs 6 and 7 of the two power units 2 and 3 are integrally connected through a hollow output shaft 13. The hollow output shaft 13 is rotatably disposed about the main shaft 10. Each power roller 8a or 8b of the front power unit 2 is disposed between the input and output cone discs 4 and 6 while being frictionally engaged at diametrically opposed ends with the same, while each power roller 9a or 9b of the rear power unit 3 is disposed between the input and output cone discs 5 and 7 while being frictionally engaged at diametrically opposed ends with the same.

Figure 5:
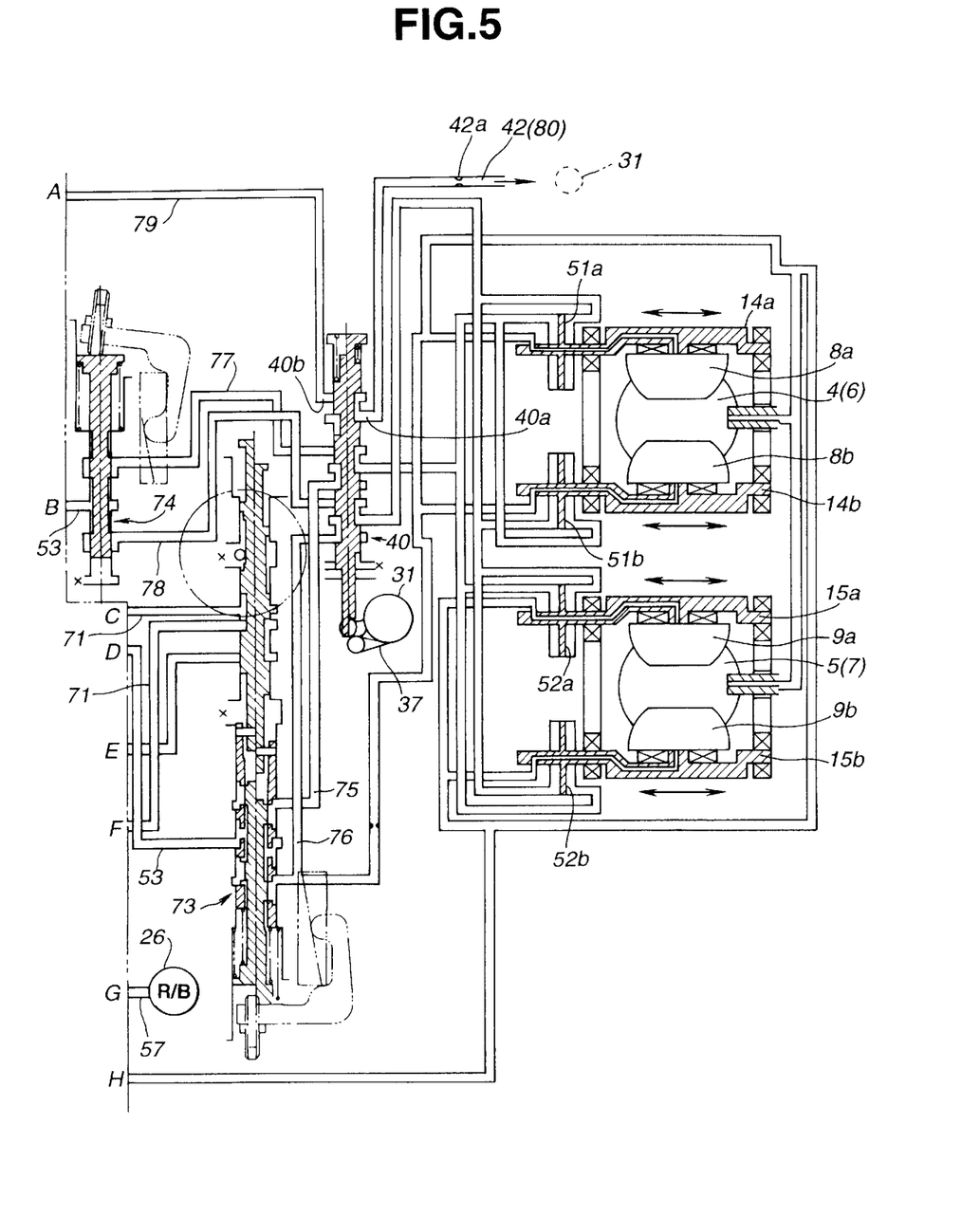

As shown in FIG. 5, the four power rollers 8a, 8b, 9a and 9b are rotatably supported on respective trunnions 14a, 14b, 15a and 15b in a known manner. The trunnions 14a and 14b of the front unit 2 are arranged in such a manner as shown in FIG. 5, which can rotate about respective power roller oscillating axes which are perpendicular to rotation axes "$O_1$" (see FIG. 1) of the power rollers 8a and 8b. As is depicted by arrows in FIG. 5, these trunnions 14a and 14b can move simultaneously in opposed directions in parallel with the respective power roller oscillating axes. Similar to the above, the trunnions 15a and 15b of the rear unit can rotate about respective power roller oscillating axes which are perpendicular to rotation axes "$O_1$" (see FIG. 1) of the power rollers 9a and 9b, and can move simultaneously in opposed directions in parallel with the respective power roller oscillating axes.

As is shown in FIGS. 1 and 2, between the output cone discs 6 and 7, there is arranged an output gear 16 which is secured to the hollow output shaft 13. Meshed with the output gear 16 is a counter gear 17 which is securely disposed on a front portion of a countershaft 18. The countershaft 18 is arranged beside the main shaft 10 in parallel with the same. A rear end of the countershaft 18 is connected through a gear unit 20 to a transmission output shaft 19 which is coaxially arranged behind the input cone disc 5 of the rear power transmission unit 3.

As is seen from FIG. 1, a transmission input shaft 21 is coaxially arranged in front of the main shaft 10 and connected to the same. Rotation of the transmission input shaft 21 whose direction is controlled by a forward/backward mode switching mechanism 22 is transmitted through a loading cam 23 to the main shaft 10, that is, to both the input cone discs 4 and 5 of the front and rear power transmission units 2 and 3.

During this rotation transmission, the loading cam 23 biases the input cone disc 4 of the front unit 2 toward the output cone disc 6 by a force in accordance with the transmission torque. A counter force of the thrust thus produced causes, through the main shaft 10 and the disc spring 12, the input cone disc 5 of the rear unit to be biased toward the output cone disc 7.

Accordingly, the power rollers 8a and 8b (or 9a and 9b) are compressed between the associated input and output cone discs 4 and 6 (or 5 and 7) by a force according to the transmission torque. With this, power transmission is carried out between the associated input and output cone discs 4 and 6 (or 5 and 7).

The forward/backward mode switching mechanism 22 is of a known type, which generally comprises a double pinion type planetary gear unit 24, a forward clutch 25 and a reverse brake 26. When the forward clutch 25 is engaged, an engine rotation from a torque converter 27 is directly transmitted to the transmission input shaft 21 to cause an associated motor vehicle to run forward. In this case, the countershaft 18 is rotated in the forward direction. While, when the reverse brake 26 is engaged, the engine rotation from the torque converter 27 is transmitted to the transmission input shaft 21 while being changed in rotation direction. In this case, the countershaft 18 is rotated in the backward direction.

The torque converter 27 is equipped with a lock-up clutch 27a. In a lock-up condition of the converter 27 wherein the lock-up clutch 27a is engaged, the engine rotation from an engine is directly applied to the forward/backward mode switching mechanism 22 without torque conversion.

In the following, operation of the above-mentioned torocoidal-type CVT will be described with reference to FIGS. 1 and 2.

The engine rotation from the torque converter 27 is inputted to the forward/backward mode switching mechanism 22. When now the forward clutch 25 is kept engaged, the engine rotation is directly transmitted to the transmission input shaft 21 as a forward rotation. In this case, the transmission takes the forward mode. While, the reverse brake 26 is kept engaged, the engine rotation is transmitted to the input shaft 21 while being changed in rotation direction, as a backward rotation. In this case, the transmission takes the reverse mode.

The forward/backward rotation of the transmission input shaft 21 is transmitted through the loading cam 23 to the input cone disc 4 of the front power transmission unit 2. At the same time, the rotation of the input cone disc 4 is transmitted through the ball-spline unit 11 and the main shaft 10 to the input cone disc 5 of the rear power transmission unit 3.

The rotation of the input cone discs 4 and 5 is transmitted to the power rollers 8a, 8b, 9a and 9b to rotate the same about the respective rotation axes "$O_1$". The rotation of these power rollers is transmitted to the output cone discs 6 and 7 to rotate s the same. The rotation of these output cone discs 6 and 7 is transmitted through the output gear 16 and the counter gear 17 to the countershaft 18 to rotate the same. The rotation of the countershaft 18 is transmitted through the gear unit 20 to the transmission output shaft 19.

When now the trunnions 14a, 14b, 15a and 15b are actuated in the above-mentioned manner, the power rollers 8a, 8b, 9a and 9b are simultaneously swung about the respective power roller oscillating axes. With this, the angle of each power roller 8a, 8b, 9a or 9b relative to the main shaft 10 is changed thereby continuously changing the power transmission ratio between the input and output cone discs 4 and 6 (or 5 and 7). With this, a transmission ratio between the transmission input and output shafts 21 and 19, that is, a speed change ratio of the torocoidal-type CVT can be continuously varied.

As is seen in FIG. 2, a reverse sensor 31 is mounted to the countershaft 18 for sensing the backward mode of the transmission, that is, the backward rotation of the countershaft 18. The detail of the reverse sensor 31 is described in the above-mentioned Japanese Patent First Provisional Publication 2-163562. As shown, the reverse sensor 31 is mounted on a front end of the countershaft 18, which is remote from the gear unit 20 (see FIG. 1). As is seen from FIG. 2, the reverse sensor 31 is positioned above a speed change control valve 32.

Figure 3:
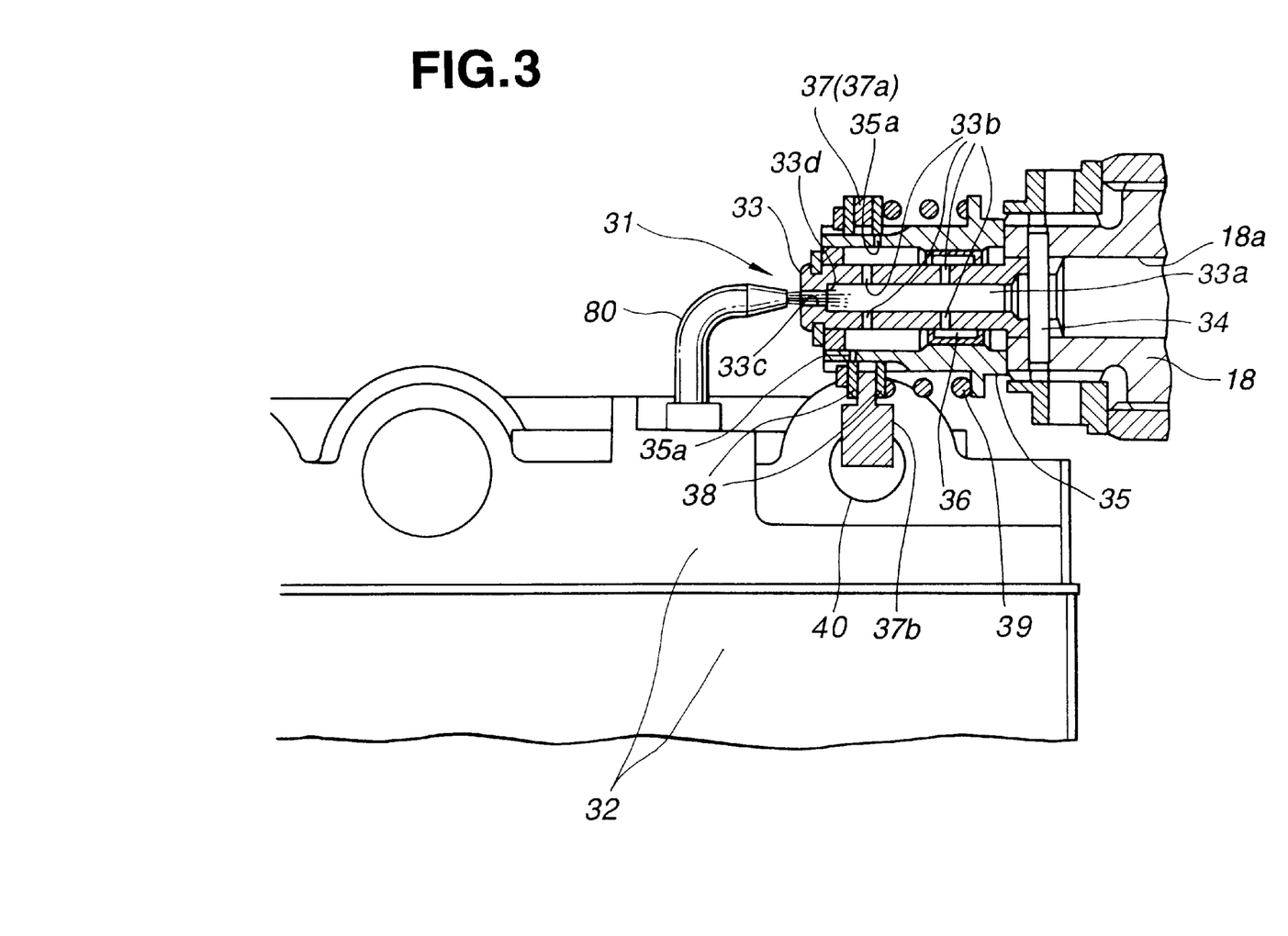
FIG. 3 is a much enlarged view of a portion of the transmission, showing a reverse sensor lubrication system of a second embodiment of the present invention.

As is best understood from FIG. 3, the reverse sensor 31 comprises a sensor shaft 33 which is fixed to the countershaft 18 by means of a pin 34. A sensor sleeve 35 is rotatably disposed on the sensor shaft 33. Between the sensor sleeve 35 and the sensor shaft 33, there is arranged a one-way clutch 36. Due to provision of this one-way clutch 36, the forward rotation of the countershaft 18 does not drive the sensor sleeve 35, but the backward rotation of the countershaft 18 drives the sensor sleeve 35 about the sensor shaft 33 in the same direction.

Rotatably disposed on the sensor sleeve 35 is a sensor arm 37 whose base end 37a is sandwiched between a pair of friction plates 38 which rotate together with the sensor sleeve 35. A coil spring 39 is disposed about the sensor sleeve 35 to cause the friction plates 38 to hold the base end with a certain biasing force. A free end 37b of the sensor arm 37 is in contact with a switch valve 40 (viz., speed change control valve switching means) installed in the control valve 32.

In the following, operation of the reverse sensor 31 will be described.

When the countershaft 18 is kept rotated in the forward direction, the sensor sleeve 35 is in its free condition due to slip condition of the one-way clutch 36. In this case, the switch valve 40 (see FIG. 5) takes a first or normal position as indicated by a left-half of the same. While, when the countershaft 18 is kept rotated in the backward direction, the sensor sleeve 35 is rotated by the countershaft 18 in the same direction due to the engaged condition of the one-way clutch 36. With this, the sensor arm 37 is drawn by the sensor sleeve 35 causing the free end 37a thereof to move the switch valve 40 (see FIG. 5) to a second position as indicated by a right-half of the same. That is, the switch valve 40 is shifted from the left-half position to the right-half-position in FIG. 5.

Because the reverse sensor 31 operates in the above-mentioned manner, lubrication of the same is needed. In particular, under the backward rotation of the countershaft 18, the frictionally drawn movement of the sensor arm 37 inevitably takes place between the friction plates 38. Thus, under this backward rotation of the countershaft 18, a larger amount of lubrication oil is needed for the sensor arm 37 than the amount needed under the forward rotation of the countershaft 18.

In the following, a system for optimally lubricating the reverse sensor 31 will be described, which is the present invention.

In the invention, lubrication of the reverse sensor 31 under the forward rotation of the countershaft 18 is carried out by using the "oil splashing effect" of the gear unit 20, as is described in the above-mentioned Japanese Patent First Provisional Publication 7-293653. As has been described hereinabove, under the forward rotation of the countershaft 18, a less amount of lubrication oil is needed for the reverse sensor 31. That is, for reserving lubrication oil splashed by the gear unit 20, a recessed portion is defined in the transmission case 1 at a relatively high position, and as is seen from FIG. 2, the oil in the recessed portion is led to the reverse sensor 31 through an axially extending bore 18a of the countershaft 18. Although not shown in the drawing, an oil passing groove is defined between the recessed portion and the bore 18a of the countershaft 18.

As is clearly understood from FIG. 3, the sensor shaft 33 has an axially extending blind bore 33a which is connected with the bore 18a of the countershaft 18. The sensor shaft 33 has further radially extending holes 33b each extending from the blind bore 33a to the outside of the sensor shaft 33. The sensor sleeve 35 has radially extending holes 35a each extending to a frictionally engaged portion between the friction plate 38 and the base end 37a of the sensor arm 37. Under rotation of the countershaft 18, the oil led into the blind bore 33a from the bore 18a of the countershaft 18 is driven radially outward due to a centrifugal force inevitably produced, and effectively led to the frictionally engaged portions between the friction plates 38 and the base end 37a of the sensor arm 37 through the holes 33b and 35a.

Lubrication of the reverse sensor 31 under the backward rotation of the countershaft 18 will be described in the following.

That is, under this backward rotation, a larger amount of lubrication oil is need for the sensor 31 for the reason which has been described hereinabove.

To fulfill this need, the work of an oil pump 41 (see FIG. 4) employed in a speed change control circuit is practically used. Furthermore, as is seen from FIG. 2, an oil injection nozzle 42 is defined in the speed change control valve 32, from which the lubrication oil from the oil pump 41 is injected toward the reverse sensor 31.

Figure 4:
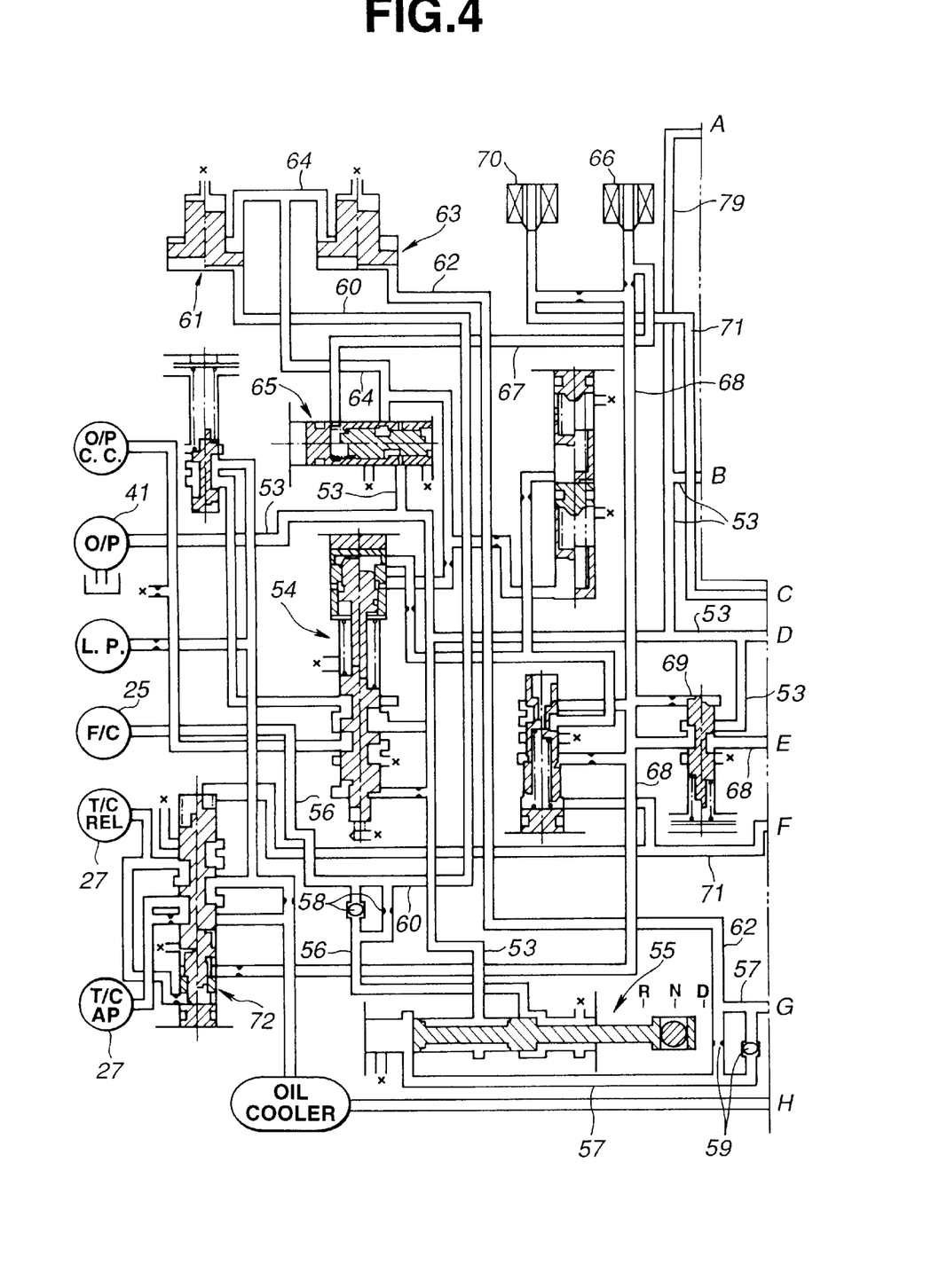
FIGS. 4 and 5 show jointly a hydraulic circuit used for controlling the torocoidal-type CVT and the reverse sensor lubrication system of the first embodiment.

As is shown in FIGS. 4 and 5, the speed change control valve 32 includes a hydraulic circuit. This circuit is basically described in Japanese Patent First Provisional Publication 4-78366. That is, the above-mentioned operation of the power rollers 8a, 8b, 9a and 9b is controlled by the circuit.

The hydraulic circuit comprises four servo-pistons 51a, 51b, 52a and 52b (see FIG. 5) in addition to the above-mentioned forward clutch 25, oil pump 41, reverse sensor 31, switch valve 40 and oil injection nozzle 42. The servo-pistons 51a, 51b, 52a and 52b operate to induce an offset movement of the power rollers 8a, 8b, 9a and 9b.

The stroke control of the servo-pistons and ON/OFF control of the forward clutch 25 and the reverse brake 26 are made as follows.

As is seen from FIG. 4, the hydraulic oil from the oil pump 41 to a circuit 53 is controlled by a pressure regulator 54 to have a predetermined line pressure which is used as a base pressure for the speed change control. The line pressure in the circuit 53 is led to a manual valve 55 which is controlled by a manually operated shift lever (not shown). When the manual valve 55 is shifted to a neutral (N) range upon requirement of standstill of an associated motor vehicle, the valve 55 blocks outputting of the line pressure to any circuit.

While, when the manual valve 55 is shifted to a drive (D) range upon requirement of forward movement of the vehicle, the valve 55 operates to feed a circuit 56 with the line pressure of the circuit 53 as D-range pressure. The D-range pressure in the circuit 56 reaches through a one-way orifice 58 to the forward clutch 25 to engage the same. Upon this engagement of the forward clutch 25, the transmission takes the forward mode wherein the countershaft 18 is rotated in the forward direction. Further, the D-range pressure in the circuit 56 reaches through a circuit 60 to a forward clutch accumulator 61. Upon this, with an aid of the one-way orifice 58, the accumulator 61 dampens undesired engaging shock of the forward clutch 25 (viz., N→ED select shock).

When the manual valve 55 is shifted to a reverse (R) range upon requirement of backward movement of the vehicle, the manual valve 55 operates to feed a circuit 57 with the line pressure of the circuit 53 as R-range pressure. The R-range pressure in the circuit 57 reaches through a one-way orifice 59 to the reverse brake 26 (see FIG. 5) to engage the same. Upon this engagement of the reverse brake 26, the transmission takes the backward mode wherein the countershaft 18 is rotated in the backward direction. Further, the R-range pressure in the circuit 57 reaches through a circuit 62 to a reverse brake accumulator 63. Upon this, with an aid of the one-way orifice 59, the accumulator 63 dampens undesired engaging shock of the reverse brake 26 (viz., N→R select shock).

In order to effectively achieve the select shock dampening, the accumulators 61 and 63 are supplied with a common back pressure from a circuit 64. The back pressure is produced by an accumulator control valve 65. The accumulator control valve 65 is fed with the line pressure of the circuit 53 for producing the back pressure. The magnitude of the back pressure is controlled or adjusted by a solenoid pressure which is fed to the valve 65 from an accumulator back pressure control duty solenoid 66 through a circuit 67.

Using a pilot pressure in a circuit 68 as a base pressure, the duty solenoid 66 provides the circuit 67 with the solenoid pressure in accordance with a solenoid drive duty. Due to the drive duty of the solenoid 66, the accumulator back pressure of S the circuit 64 can be controlled to an optimal value. The pilot pressure in the circuit 68 is a constant pressure provided by reducing the line pressure of the circuit 53 by a pilot valve 69. The above-mentioned duty control is based on the pilot pressure which is constant.

The pilot pressure in the circuit 68 is used also for allowing a lock-up solenoid 70 to carry out a lock-up control of the torque converter 27 (see FIG. 1). When the lock-up solenoid 70 provides a circuit 71 with no lock-up control pressure and thus a lock-up control valve 72 (see FIG. 4) takes a position as shown by a right-half thereof, the lock-up clutch 27a becomes engaged inducing a lock-up condition of the torque converter 27. While, when the lock-up solenoid 70 provides the circuit 71 with the lock-up control pressure and thus the lock-up control valve 72 (see FIG. 4) takes a position as shown by a left-half thereof, the lock-up clutch 27a becomes disengaged inducing normally operating condition of the torque converter 27.

As is seen in FIG. 5, for controlling the servo-pistons 51*a*, 51*b*, 52*a* and 52*b*, there are employed a forward movement speed control valve 73 and a backward movement speed control valve 74. In corporation with the above-mentioned switch valve 40, these two valves 73 and 74 carry out the speed change control of the transmission under forward and backward modes.

Under speed changing, the forward movement speed control valve 73 provides the line pressure of the circuit 53 to a circuit 75 or a circuit 76 as a speed change control pressure. Upon receiving this control pressure, the servo-pistons 51*a*, 51*b*, 52*a* and 52*b* participate in the speed change control under the forward mode of the transmission. Under speed changing, the backward movement speed control valve 74 provides the line pressure of the circuit 53 to a circuit 77 or a circuit 78 as a speed change control pressure. Upon receiving this control pressure, the servo-pistons 51*a*, 51*b*, 52*a* and 52*b* participate in the speed change control under the backward mode of the transmission.

As has been described hereinabove, when the transmission is in the forward mode wherein the countershaft 18 is rotated in the forward direction, the switch valve 40 takes the normal position as indicated by a left-half in FIG. 5. In this case, the switch valve 40 communicates the circuits 75 and 76 with the servo-pistons 51*a*, 51*b*, 52*a* and 52*b*, and thus, the speed change control of the transmission is carried out by the forward movement speed change control valve 73. While, when the transmission is in the backward mode wherein the countershaft 18 is rotated in the backward direction, the switch valve 40 takes the right-half position in FIG. 5. In this case, the switch valve 40 communicates the circuits 77 and 78 with the servo-pistons 51*a*, 51*b*, 52*a* and 52*b*, and thus, the speed change control of the transmission is carried out by the backward movement speed change control valve 74.

In the present invention, the switch valve 40 is formed with both an outlet port 40*a* and an inlet port 40*b* (see FIG. 5). The outlet port 40*a* is communicated with the above-mentioned oil injection nozzle 42 (see FIG. 2). When, due to backward mode of the transmission, the switch valve 40 takes the right-half position in FIG. 5, the inlet port 40b becomes communicated with the outlet port 40*a*. The inlet port 40*b* is communicated with the line pressure circuit 53 through a circuit 79. Preferably, an orifice 42*a* (see FIG. 5) may be installed in the oil injection nozzle 42.

In the following, operation of the reverse sensor lubricating system of the first embodiment of the invention will be described.

Under the forward mode of the transmission, the lubrication oil splashed by the gear unit 20 (see FIG. 1) and thus reserved in the upper recessed portion in the transmission is led to entire of the reverse sensor 31 through the bore 18*a* of the countershaft 18, in such a manner as has been described hereinabove. In fact, under this forward mode, a less amount of lubrication oil is needed for the reverse sensor 31. Due to slip operation of the one-way clutch 36 in the reverse sensor 31, the switch valve 40 takes the normal position, that is, the left-half position in FIG. 5, so that the communication between the inlet and outlet ports 40*b* and 40*a* is blocked. Thus, the pressurized oil in the circuit 79 is prevented from flowing to the oil injection nozzle 42. It is to be noted that under the forward mode of the transmission, the hydraulic oil flowing in the hydraulic circuit shown in FIGS. 4 and 5 does not participate in lubricating the reverse sensor 31.

While, under the backward mode of the transmission wherein the sensor sleeve 35 is driven by the countershaft 18, the sensor arm 37 is kept drawn by the sensor sleeve 35 and thus the free end 37*b* of the sensor arm 37 moves the switch valve 40 to the right-half position in FIG. 5. Thus, the communication between the inlet and outlet ports 40*b* and 40*a* of the switch valve 40 becomes open, so that the pressurized oil in the circuit 79 is directed to the oil injection nozzle 42. Thus, as is seen from FIG. 2, the oil is injected from the nozzle 42 toward the reverse sensor 31. It is to be noted that under the backward mode of the transmission, the reverse sensor 31 is supplied with the lubrication oil from two oil supply routes, one being the route including the nozzle 42 and the other being the route including the bore 18*a* of the countershaft 18. That is, a larger amount of lubrication oil can be supplied to the reverse sensor 31. It is to be also noted that under the backward mode of the transmission, usage of the hydraulic oil in the hydraulic circuit has substantially no bad effect on the backward movement of an associated motor vehicle.

As is described hereinabove, in the present invention, lubrication of the reverse sensor 31 is optimally carried out in both the forward mode of the transmission wherein a less amount of lubrication oil is needed and the backward mode of the transmission wherein a larger amount of lubrication oil is needed.

If desired, in place of the nozzle 42 formed in the speed change control valve 32, such a nozzle member 80 as shown in FIG. 3 may be used, which is mounted on the control valve 32. The nozzle member 80 is constructed to inject the lubrication oil into the reverse sensor 31 under the backward mode of the transmission.

As shown in FIG. 3, the front end of the sensor shaft 33 is formed with a smaller opening 33*c* which is merged with the blind bore 33*a*. The diameter of the opening 33*c* is smaller than that of the blind bore 33*a*, so that a certain step 33*d* is defined between the opening 33*c* and the blind bore 33*a*. The nozzle member 80 is positioned in front of the reverse sensor 31 and has a nozzle end curved toward the opening 33*c* of the sensor shaft 33. Of course, the nozzle member 80 is connected to the outlet port 40*a* of the switch valve 40. Under the backward mode of the transmission, the lubrication oil is led into the blind bore 33*a* through the opening 33*c*, and due to the centrifugal force produced, the oil in the blind bore 33*a* is driven radially outward through the holes 33*b* and 35*a*. With this, the reverse sensor 31 is effectively lubricated under the backward mode of the transmission. Due to provision of the step 33*d*, a certain amount of lubrication oil is remained in the blind bore 33*a*, and thus satisfied lubrication of the reverse sensor 31 is achieved even under the forward mode of the transmission.

It is to be noted that the above-mentioned embodiments of FIGS. 2 and 3 are provided by providing nozzle means 42 or 80 and by making a slight modification to the conventional switch valve 40, that is, by forming the valve 40 with inlet and outlet ports 40*b* and 40*a*.

In the above-mentioned first and second embodiments, the line pressure oil led to the switch valve 40 is used for lubricating the reserve sensor 31 under the backward mode of the transmission.

If desired, however, pressurized fluid other than the line pressure fluid may be used for the lubrication in the present invention.

Figure 6:
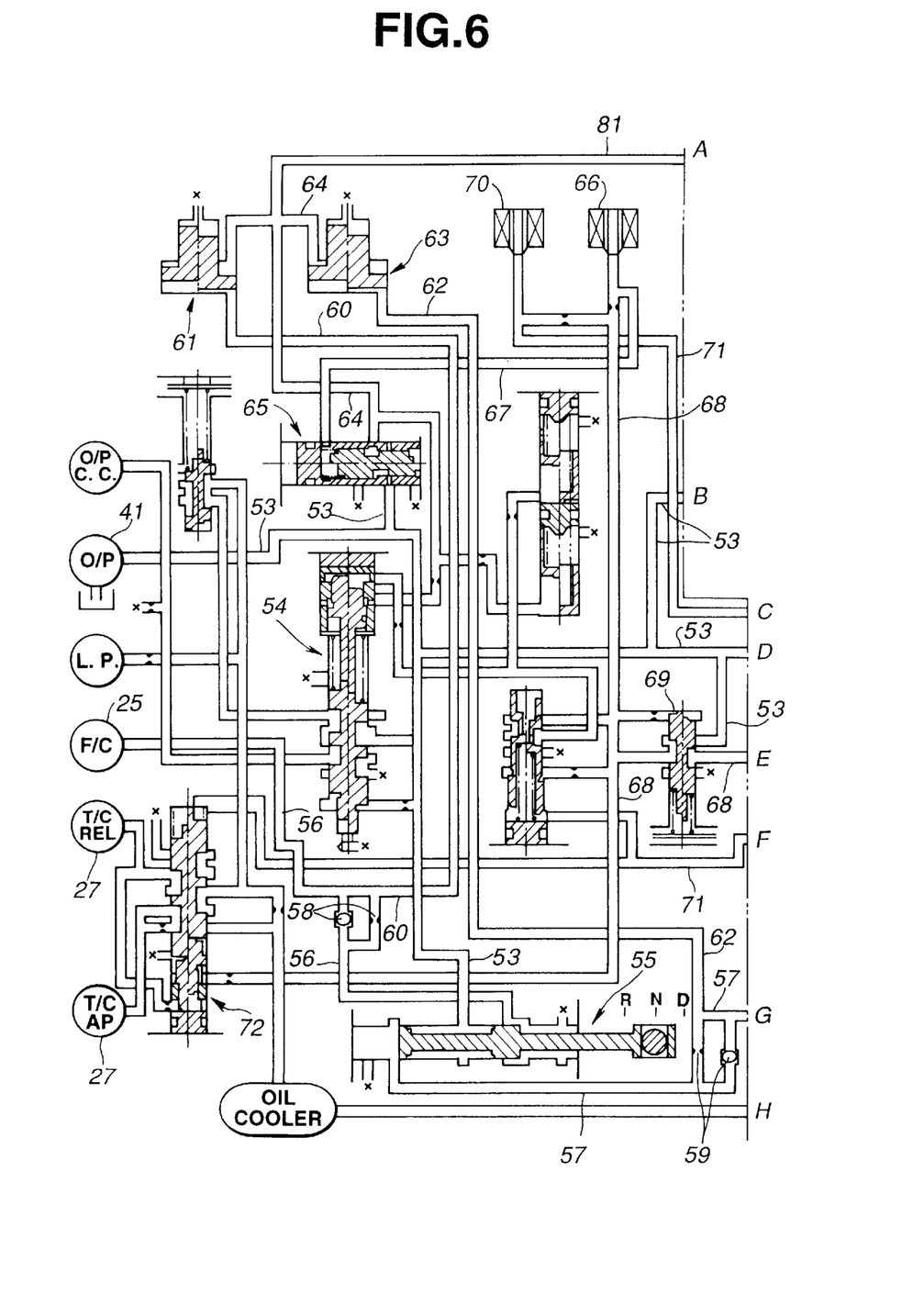
FIG. 6 is a view similar to FIG. 4, but showing a hydraulic circuit used in a third embodiment of the present invention.

In a third embodiment of FIG. 6, pressurized fluid in the accumulator back pressure circuit 64 is used for such lubrication. A circuit 81 extending from the circuit 64 is provided, which is connected to the circuit 79 of FIGS. 4 and 5 and thus connected to the inlet port 40b of the switch valve 40. Thus, the fluid in the circuit 64 can be selectively applied to the nozzle 42 or 80 like in the above-mentioned manner.

Figure 7:
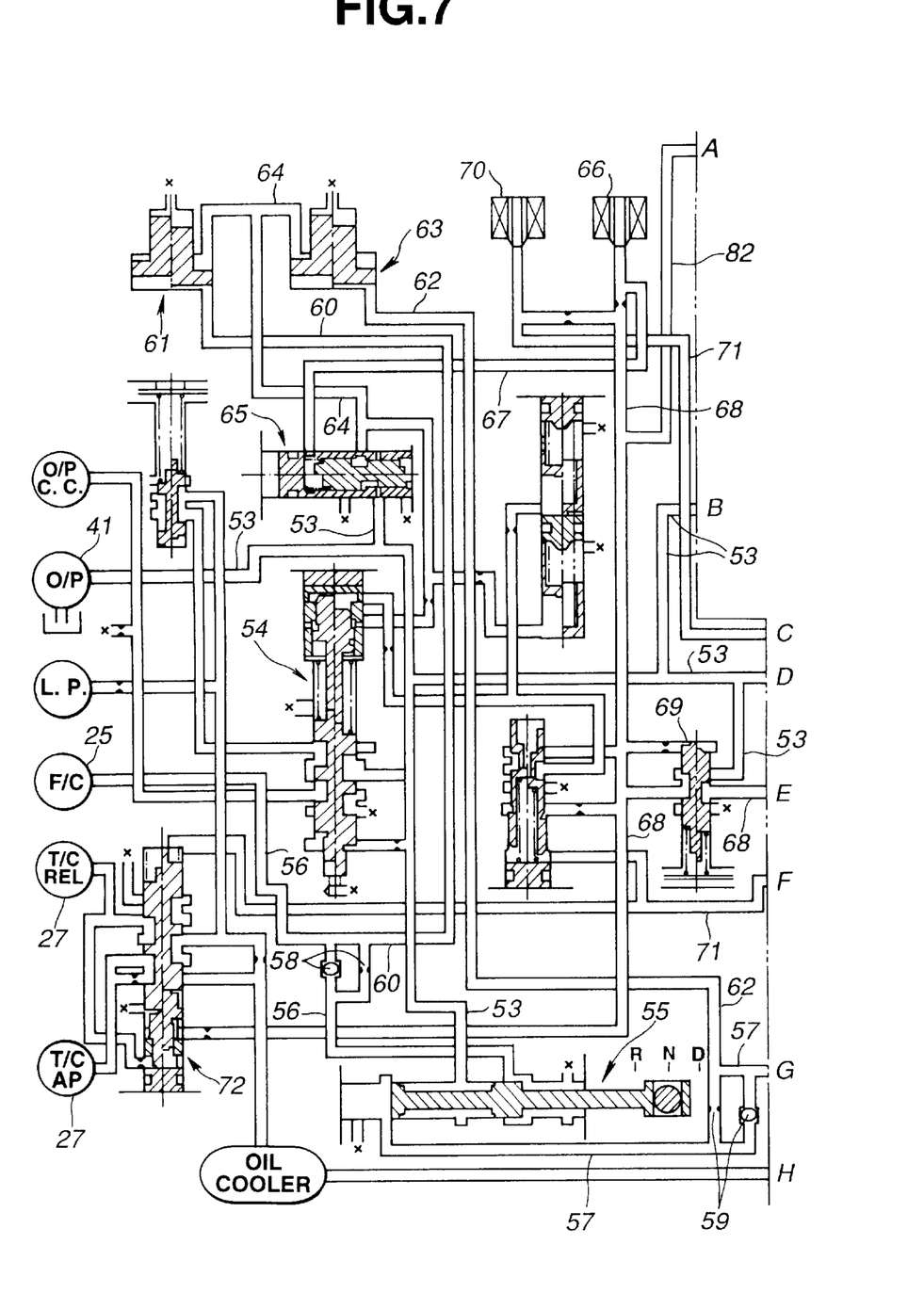
FIG. 7 is a view similar to FIG. 4, but showing a hydraulic circuit used in a fourth embodiment of the present invention.

In a fourth embodiment of FIG. 7, pressurized fluid in the pilot pressure circuit 68 is used for such lubrication. A circuit 82 extending from the circuit 68 is provided, which is connected to the circuit 79 of FIGS. 4 and 5 and thus connected to the inlet port 40b of the switch valve 40. Thus, the fluid in the circuit 68 can be selectively applied to the nozzle 42 or 80.

Figure 8:
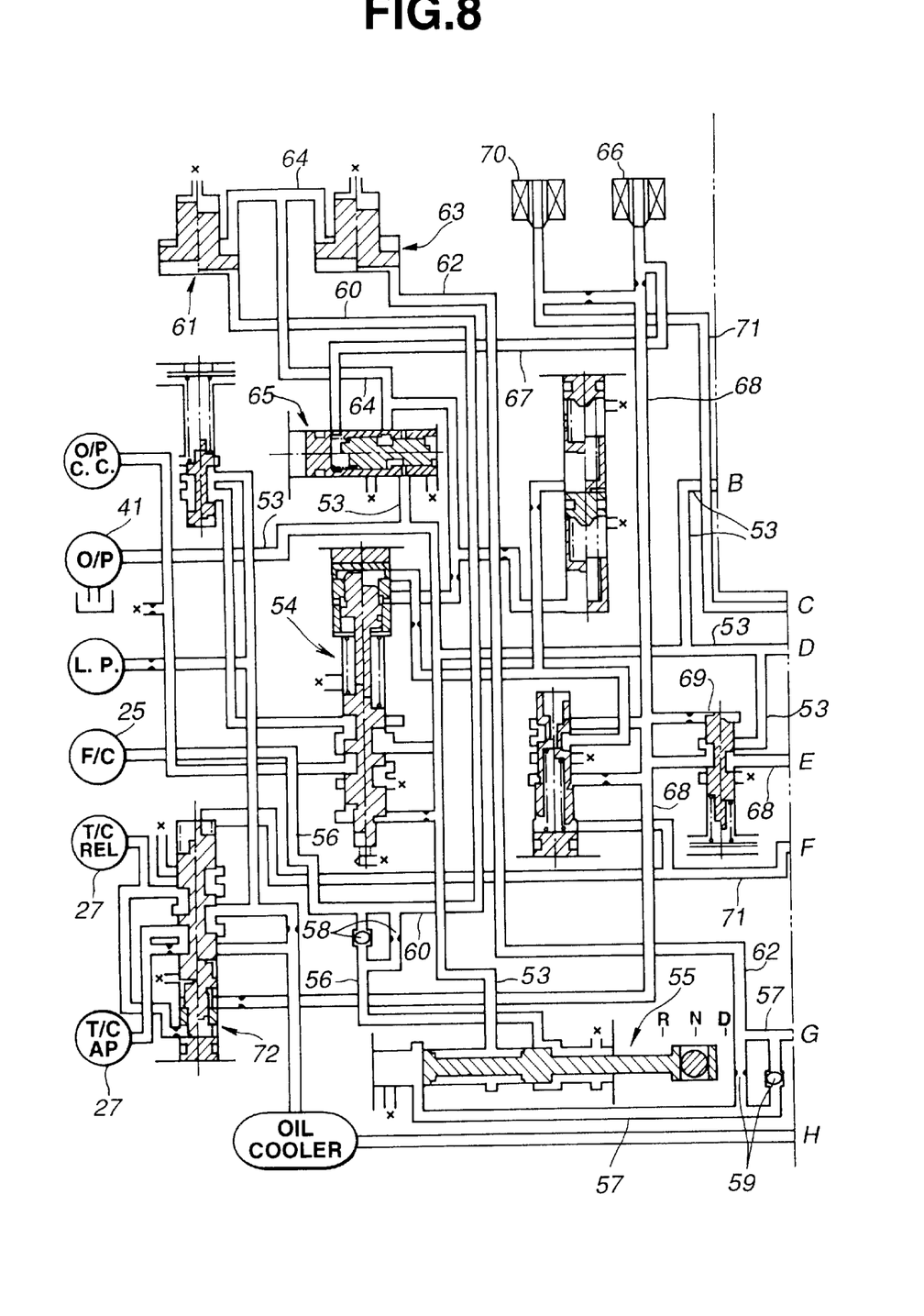
FIGS. 8 and 9 show jointly a hydraulic circuit used in a fifth embodiment of the present invention.
Figure 9:
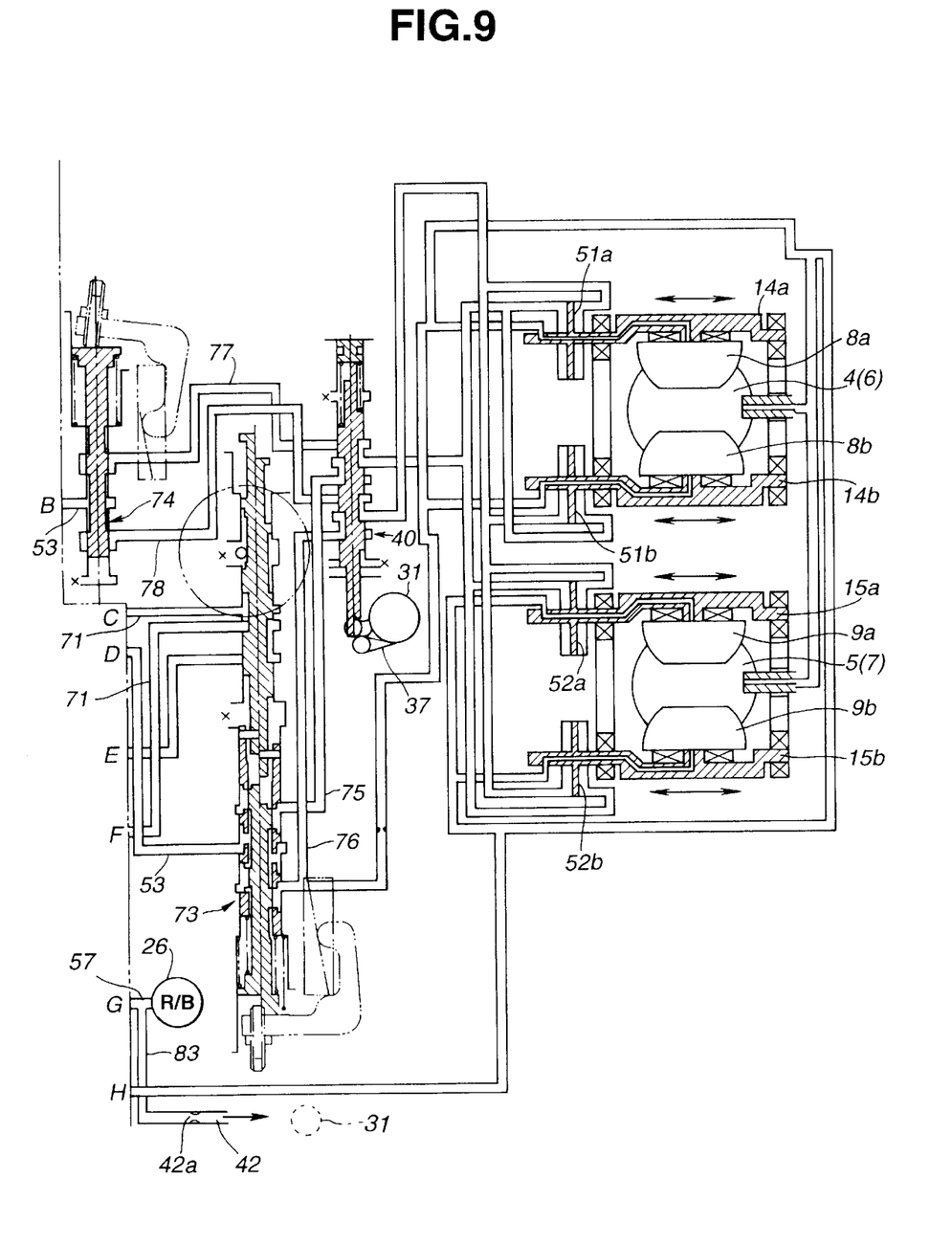

In a fifth embodiment of FIGS. 8 and 9, pressurized fluid provided only when the transmission takes the backward mode is used for such lubrication. As is seen from FIG. 9, the nozzle 42 (or 80) is connected through a circuit 83 to the circuit 57. That is, when the manual valve 55 (see FIG. 8) is manipulated to take the R-range, part of the pressurized fluid directed toward the reverse brake 26 is directed to the nozzle 42 or 80 for lubricating the reverse sensor 31.

Figure 10:
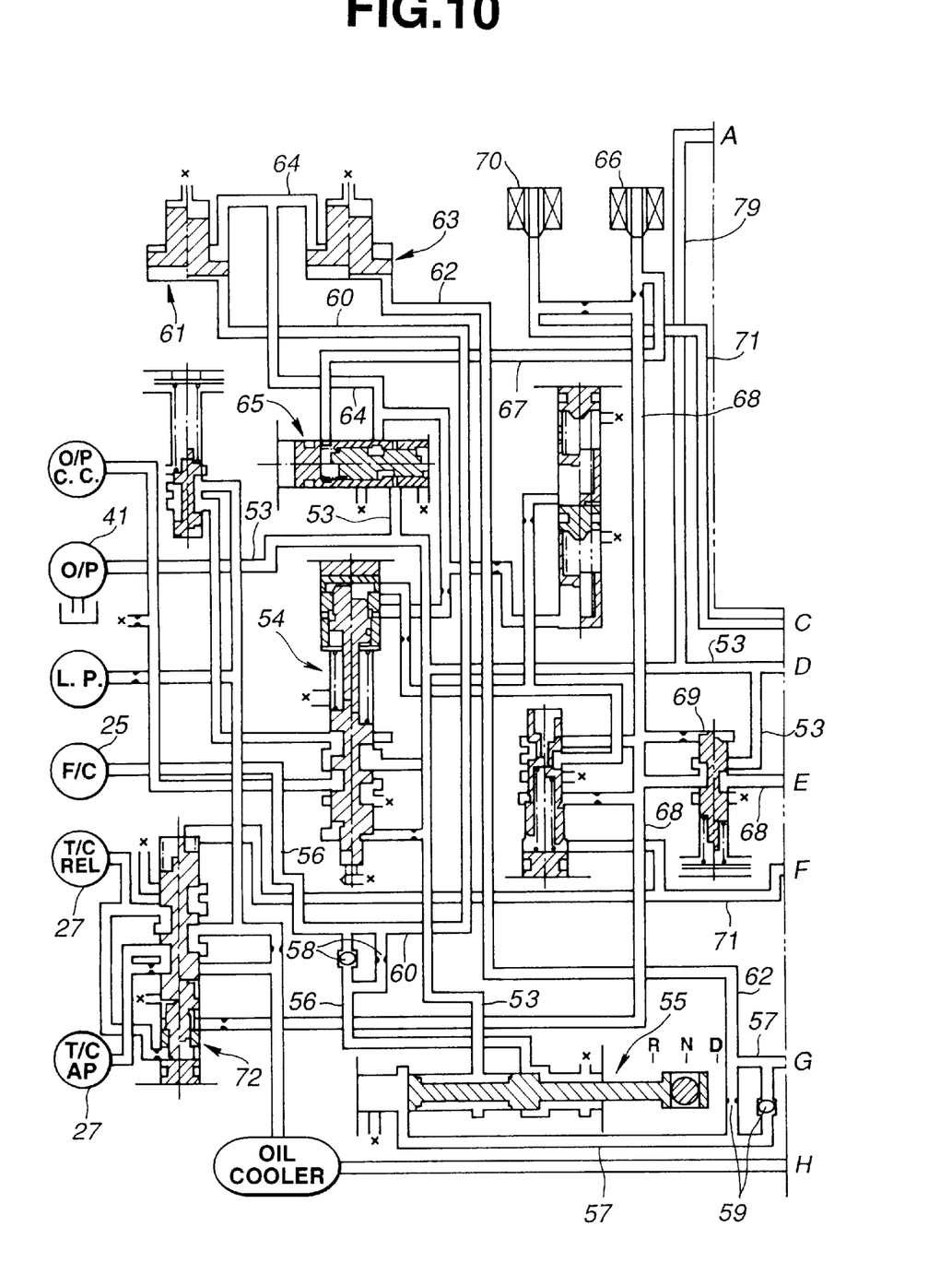
FIGS. 10 and 11 show jointly a hydraulic circuit used in a sixth embodiment of the present invention.
Figure 11:
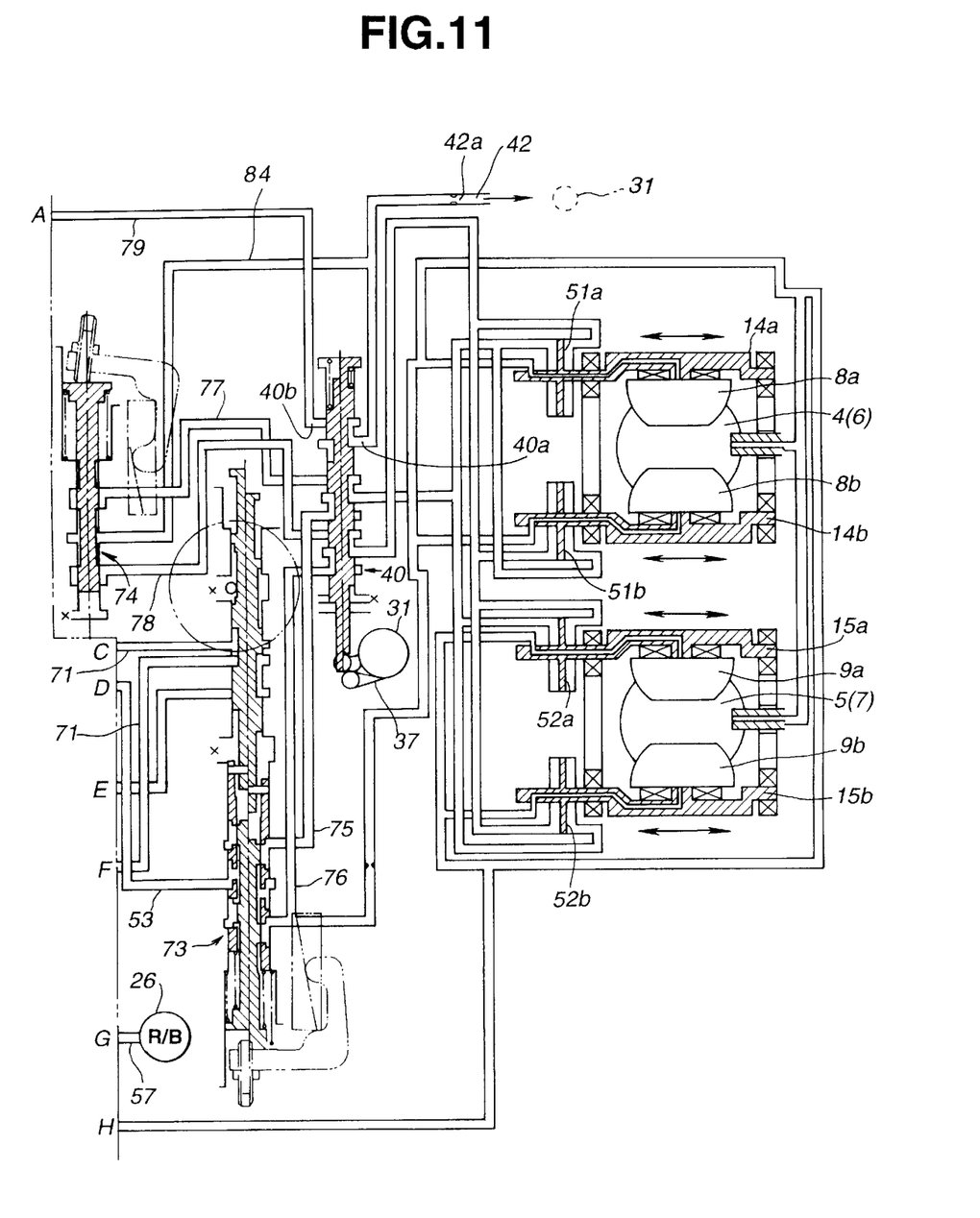

In a sixth embodiment of FIGS. 10 and 11, a construction similar to that of the first embodiment of FIGS. 4 and 5 is employed. However, in this sixth embodiment, the outlet port 40a of the switch valve 40 and the nozzle 42 are connected through a circuit 84, and the circuit 84 is connected to an inlet port of the backward movement speed control valve 74. That is, in the sixth embodiment, the inlet port of the valve 74 is isolated from the line pressure circuit 53, unlike the case of the first embodiment. Under the backward mode of the transmission, the input port of the valve 74 is fed with a pressurized fluid which is directed toward the nozzle 42. Under the forward mode of the transmission, the inlet port of the valve 74 is not fed with the operating fluid, thus, under this mode, undesired leakage of the line pressure fluid from the valve 74 can be suppressed or at least minimized.

For the following reasons, the reverse sensor lubricating system of the present invention is suitable for the transmissions mounted on a front-engine rear-drive vehicle (viz., FR vehicle). That is, in towing the FR vehicle, the vehicle is pulled forward facing forward with the rear road wheels contacting the road. This means that during the towing the transmission in the vehicle keeps the forward mode and thus the oil splashing effect of the gear unit 20 (see FIG. 1) is achieved. Thus, even during the towing, the reverse sensor 31 is suitable lubricated.

What is claimed is:

1. In a toroidal type continuously variable transmission including a forward/backward mode switching mechanism, a toroidal type power transmission unit powered by said switching mechanism, a power transmission shaft driven by an output cone disc of said power transmission unit, a transmission output shaft driven by said power transmission shaft through a gear unit interposed therebetween, a speed change control valve switching means which selectively actuates a forward movement speed change control valve and a backward movement speed change control valve, a reverse sensor which is mounted on said power transmission shaft to cause said switching means to actuate said backward movement speed change control valve when said power transmission shaft is rotated in a backward direction, and a hydraulic circuit which controls operation of the transmission, a system for lubricating said reverse sensor, comprising:
a first block which, when said power transmission shaft is rotated in a forward direction, lubricates said reverse sensor by using a fluid splashed by said gear unit; and a second block which, when said power transmission shaft is rotated in the backward direction, lubricates said reverse sensor by using a pressurized fluid provided by an oil pump installed in said hydraulic circuit.

2. The reverse sensor lubrication system as claimed in claim 1, in which said second block comprises:
a nozzle having a nozzle opening directed toward said reverse sensor;
a fluid circuit connecting said nozzle to a part of said hydraulic circuit, said part containing a fluid pressurized by said oil pump; and
a switch valve which opens said fluid circuit when said power transmission shaft is rotated in the backward direction and closes said fluid circuit when said power transmission shaft is rotated in the forward direction.

3. The reverse sensor lubrication system as claimed in claim 2, in which said switch valve is a valve additionally possessed by said switching means.

4. The reverse sensor lubrication system as claimed in claim 2, in which said switch valve is a manual valve installed in said hydraulic circuit, and in which when said manual valve is shifted to R-range, said manual valve feeds said nozzle with part of the pressurized fluid directed to a reverse brake.

5. The reverse sensor lubrication system as claimed in claim 2, in which said nozzle is formed in a block of said forward and backward movement speed change control valves, and in which said nozzle is constructed and arranged to inject the pressurized fluid to said reverse sensor from the outside of the sensor.

6. The reverse sensor lubrication system as claimed in claim 2, in which said nozzle is a separate nozzle member mounted on a block of said forward and backward movement speed change control valves, and in which said reverse sensor is formed with an opening through which the pressurized fluid from said nozzle is led into a center bore of said reverse sensor.

7. The reverse sensor lubrication system as claimed in claim 6, in which the opening of said reverse sensor is provided in a concentric part of a leading end of said reverse sensor.

8. The reverse sensor lubrication system as claimed in claim 7, in which the diameter of said opening is smaller than that of aid center bore thereby to define a step therebetween.

9. The reverse sensor lubrication system as claimed in claim 2, in which said first block comprises:
a recessed portion formed in said transmission to reserve therein the fluid splashed by said gear unit; and
an axially extending bore formed in said power transmission shaft, said axially extending bore conveying the fluid from said recessed portion to an interior of said reverse sensor.

10. The reverse sensor lubrication system as claimed in claim 2, in which said second block further comprises another fluid circuit which extends between said nozzle and an inlet port of said backward movement speed change control valve.

11. In a toroidal type continuously variable transmission including a forward/backward mode switching mechanism, coaxially arranged front and rear toroidal type power transmission units powered by said switching mechanism, a countershaft driven by output cone discs of the two power transmission units, a transmission output shaft driven by said countershaft through a gear unit interposed therebetween, a speed change control valve switching means which selectively actuates a forward movement speed change control valve and a backward movement speed change control valve, a reverse sensor mounted on said countershaft to cause said switching means to actuate said backward movement speed change control valve when said countershaft is rotates in a backward direction, and a hydraulic circuit which controls operation of the transmission,  a system for lubricating said reverse sensor, comprising:
  a recessed portion formed in the transmission to reserve therein a fluid splashed by said gear unit;
  an axially extending bore formed in said countershaft to convey the fluid from said recessed portion to an interior of said reverse sensor;
  a nozzle directed toward said reverse sensor;
  a fluid circuit connecting said nozzle to a part of said hydraulic circuit, said part containing a fluid pressurized by said oil pump; and
  a switch valve which opens said fluid circuit when said countershaft is rotated in the backward direction and closes said fluid circuit when said countershaft is rotated in the forward direction.

\* \* \* \* \*